(12) United States Patent
Srinivasan et al.

(10) Patent No.: US 9,720,829 B2
(45) Date of Patent: Aug. 1, 2017

(54) ONLINE LEARNING BASED ALGORITHMS TO INCREASE RETENTION AND REUSE OF GPU-GENERATED DYNAMIC SURFACES IN OUTER-LEVEL CACHES

(75) Inventors: Suresh Srinivasan, Bangalore (IN); Rakesh Ramesh, Stanford, CA (US); Sreenivas Subramoney, Bangalore (IN); Jayesh Gaur, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 13/993,811

(22) PCT Filed: Dec. 29, 2011

(86) PCT No.: PCT/US2011/067962
§ 371 (c)(1),
(2), (4) Date: Aug. 29, 2014

(87) PCT Pub. No.: WO2013/101120
PCT Pub. Date: Jul. 4, 2013

(65) Prior Publication Data
US 2014/0368524 A1  Dec. 18, 2014

(51) Int. Cl.
*G06F 12/08* (2016.01)
*G06F 12/0802* (2016.01)
*G06F 12/0888* (2016.01)
*G06T 1/60* (2006.01)

(52) U.S. Cl.
CPC ...... *G06F 12/0802* (2013.01); *G06F 12/0888* (2013.01); *G06T 1/60* (2013.01); *G06T 2200/28* (2013.01)

(58) Field of Classification Search
None
See application file for complete search history.

(56) References Cited

U.S. PATENT DOCUMENTS

| 6,105,111 A * | 8/2000 | Hammarlund ........ G06F 12/123 711/128 |
| 6,721,852 B2 | 4/2004 | Shanahan et al. |
| 7,023,445 B1 * | 4/2006 | Sell .................... G09G 5/363 345/537 |
| 7,415,575 B1 * | 8/2008 | Tong ................... G06F 12/126 711/129 |
| 8,041,897 B2 | 10/2011 | Biles et al. |
| 8,504,773 B1 * | 8/2013 | Glasco ................. G06F 15/167 711/118 |

(Continued)

OTHER PUBLICATIONS

PCT/US2011/067962 Notification of Transmittal of the International Search Report and the Written Opinion of the International Searching Authority, or the Declaration, mailed Jul. 10, 2014, 5 pages.

*Primary Examiner* — Phi Hoang
*Assistant Examiner* — Yu Chen
(74) *Attorney, Agent, or Firm* — NDWE LLP

(57) ABSTRACT

Some implementations disclosed herein provide techniques for caching memory data and for managing cache retention. Different cache retention policies may be applied to different cached data streams such as those of a graphics processing unit. Actual performance of the cache with respect to the data streams may be observed, and the cache retention policies may be varied based on the observed actual performance.

20 Claims, 6 Drawing Sheets

(56) References Cited

U.S. PATENT DOCUMENTS

| | | | |
|---|---|---|---|
| 8,706,964 B1* | 4/2014 | Koh | G06F 12/0888 |
| | | | 711/118 |
| 8,868,838 B1* | 10/2014 | Glasco | G06F 12/126 |
| | | | 711/133 |
| 2003/0088591 A1 | 5/2003 | Fish | |
| 2010/0235579 A1* | 9/2010 | Biles | G06F 12/127 |
| | | | 711/125 |
| 2013/0138889 A1* | 5/2013 | Chockler | G06F 12/0866 |
| | | | 711/129 |

* cited by examiner

ONLINE LEARNING BASED ALGORITHMS TO INCREASE RETENTION AND REUSE OF GPU-GENERATED DYNAMIC SURFACES IN OUTER-LEVEL CACHES

CROSS-REFERENCE TO RELATED APPLICATIONS

This patent application is a U.S. National Phase Application under 35 U.S.C. §371 of International Application No. PCT/US2011/067962, filed Dec. 29, 2011, entitled ONLINE LEARNING BASED ALGORITHMS TO INCREASE RETENTION AND REUSE OF GPU-GENERATED DYNAMIC SURFACES IN OUTER-LEVEL CACHES.

TECHNICAL FIELD

Some embodiments of the invention relate generally to managing data caches for graphics processing units. More particularly, some embodiments of the invention relate to managing data retention in outer level caches of graphics processing units.

BACKGROUND ART

Data caches are used in many environments to increase speed and reduce memory bandwidth requirements. In operation, accessing a data item from memory causes the data item to be stored in the cache. Subsequent accesses to the data item may be satisfied directly from the cache, avoiding more costly transfers from memory.

As the cache becomes full, it becomes necessary to clear cache locations to make room for new data. A typical cache management scheme identifies the least recently accessed data items of the cache as candidates to be cleared. Thus, cache locations that have not been accessed recently are more likely to be cleared, while cache locations that have most recently been accessed are given preference for cache retention.

More specifically, this type of cache management policy may be implemented by a scheme referred to as the "Quad-Age" cache management algorithm. Each cached data item is associated with two bits indicating its "age." The age of a data item may range from 0 to 3, with 0 indicating a least recently used and most vulnerable item for eviction from the cache, and 3 indicating a most recently used item, having high retention priority. The cache locations are then managed in accordance with three policies:

Insertion Age Policy. When a data item is inserted into the cache, it is given an age of "1".
Hit Promotion Policy. When a data item is subsequently accessed from the cache (referred to as a "hit"), its age is promoted to "3".
Eviction Policy. In order to find a data item to be cleared, the cache is searched for the first data item having an age of "0", and that item is cleared. If no such data item is found, the ages of all data items are decremented and the search is performed again. This decrementing and searching is repeated until a data item having an age of "0" is found.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Large-scale integrated circuits and other systems, including processors and other devices, often use one or more data caches to address memory bandwidth issues. In some environments, a common cache may be used by several different processing components. As an example, a single system or integrated circuit may include a number of CPUs (central processing units) or processing cores, as well as a GPU (graphics processing unit). In addition, an element such as a GPU may itself contain various different processors or processing components. In some systems, the CPUs, the GPU, and the various processors of the GPU may share a common cache, which may sometimes be referred to as a "last-level cache."

The examples described below implement cache management schemes in which different cache retention policies may be implemented for data streams originating from different processing components, such as different components of the GPU. In addition, an individual cache retention policy may be varied in response to currently observed performance of the cache. Cache retention policies may be monitored and varied on a per-stream basis, in situations where different components of a GPU generate different data streams.

Figure 1:
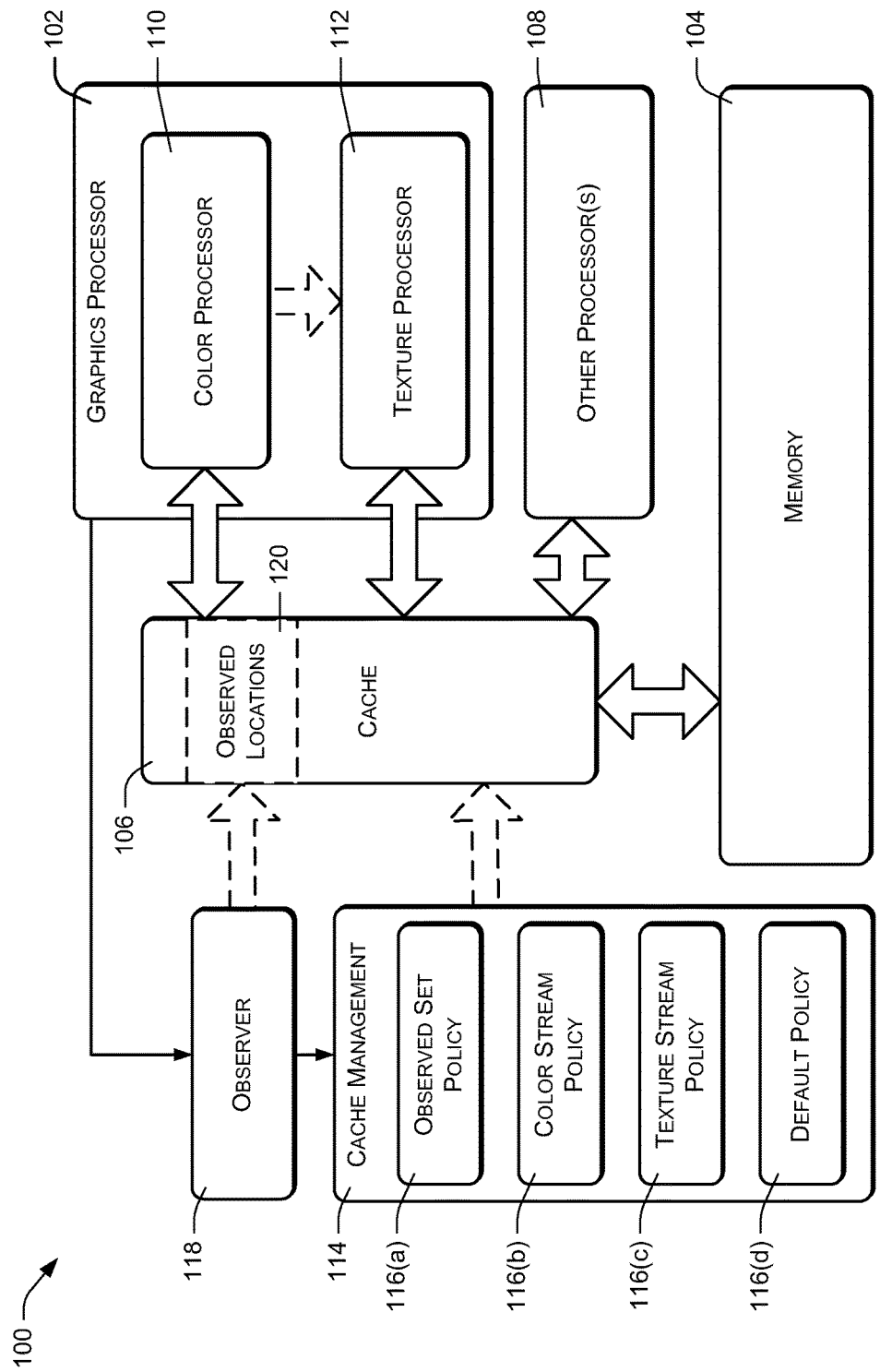
FIG. 1 is a block diagram illustrating an example of a processor, device, or system in which the described cache management techniques may be implemented.

FIG. 1 illustrates a system 100 including one embodiment of a processor as an example of an environment in which these cache management schemes may be implemented. The system 100 may be any of a wide variety of types of processors. For example, the system 100 may be a general purpose processor usable for a variety of applications including computers such as desktop, laptop, server, embedded, etc., computers. The system 100 may also be a special purpose processor such as a network processor, a communications processor, a graphics processor, a digital signal processor, or any other type of special purpose processor that may benefit from cache memory.

In this example, the system 100 has a graphics processing unit 102, memory 104, and a memory cache 106. The system 100 may include other elements, components, or processors 108, which may include one or more CPU cores and which may share the memory 104 and cache 106 with the graphics processor 102.

The graphics processor 102 may be implemented as a series of processing components, referred to as a processing pipeline. In the example of FIG. 1, such a processing pipeline is formed by a color processor 110 and a texture processor 112.

In practice, a graphics processing pipeline may include a number of different processors. Furthermore, each processor, such as the color processor 110 and the texture processor 112, may be implemented as a separate pipeline of components or processors. Accordingly, the configuration of FIG. 1 is shown merely as a simplified example in which different processing components may use a common outer-level data cache, here labeled as 106. Note that individual components may use the cache 106 both for their own data and for data that is to be subsequently used by other components of the graphics processing pipeline. Also note that other, non-graphics components may also utilize the cache 106. For example, in an implementation in which the system 100 contains one or more integrated CPU cores, such CPU cores may also use the cache 106.

Generally, the graphics processor 102 retrieves high-level instructions and data from the memory 104 and interprets the instructions and data to create a series or sequence of images or image frames. Each image contains an array of pixels. More specifically, the 3D graphics pipeline typically transforms a set of vertices corresponding to a world of objects to a rasterized pixilated output frame that can be displayed in two dimensions. The vertices are fetched from memory and shaded and rasterized into pixels by a color processor. These pixels are then shaded by using color, depth and other attributes. Finally textures are mapped onto the surfaces for commonly rendered objects in the frame by a texture processor.

In the example shown, the color processor 110 creates individual pixels of the images and specifies their nominal colors. The texture processor 112 subsequently shades the pixels to implement textures.

Textures may be static textures or dynamic textures. A static texture is a texture that is stationary, such as might be used to represent a brick wall. A static texture is typically retrieved from memory as an image. A dynamic texture is a texture that moves, such as might be used to represent rippling water. A dynamic texture is typically generated by the graphics processor 102 before the graphics processor applies it to an image.

In the course of processing a series of image frames, the components of the graphics processor 102 may produce and store intermediate results, either for their own use or for the use of subsequent processing components in the pipeline. In addition, certain types of data may be cached and then used repeatedly by one or more of the processing components.

The memory 104 is available for general data storage needs of the graphics processor. In addition, the cache 106 is available as a high-speed buffer for data that is read or created by the graphics processor 102, and that may be needed by the graphics processor 102 at a later time. Reading from the cache 106 is typically much faster than reading from the memory 104, and may also be more efficient with regard to power consumption for the same raw bandwidth delivered. In the environment of FIG. 1, the cache 106 is shared by the components of the graphics processor 102 (the color processor 110 and the texture processor 112) and other processors 108. Each of the components represents a potential data stream that could be stored by cache 106.

The cache 106 is managed by cache management logic 114 with the objective of maximizing the number of "hits" to the cache. A cache "hit" occurs when the graphics processor 102 (or other component) is able to retrieve a requested data item from the cache 106, rather than having to retrieve it from the memory 104. A cache "miss" occurs when the requested data item is not available from the cache 106, and must be instead retrieved from the memory 104.

Cache management involves storing recently accessed data from the memory 104 and determining which previously stored data should be discarded from the cache. In order to make room for newly accessed data items, the cache management logic 114 applies one or more cache retention policies 116. The retention policies 116 indicate which locations or data items of the cache 106 should be cleared to make room for newly accessed data or inserted data items.

Different cache retention policies 116 are potentially applied to the respective data streams of the various components that share the cache 106. In the implementation illustrated by FIG. 1, the cache retention policies include four different policies, designated as 116(*a*), 116(*b*), 116(*c*), and 116(*d*), which will be described in more detail below. The policies may be applied to different data streams or types of data streams, and each policy may be either a fixed or variable policy.

The system 100 may include a cache observer 118 that observes and/or determines aspects of current cache performance. Cache performance may be evaluated in various ways. For example, the number, rate, or percentage of cache hits may be observed to indicate a measure of performance.

The observer 118 and/or the cache management logic 114 may receive information from the graphics processor indicating which of its components has generated each data item and which of its components has subsequently accessed or generated a hit with respect to that data item. For example, the observer 118 may be able to determine whether the color processor 110 or the texture processor 112 generated or accessed a particular cached data item.

Data generated, cached, and/or accessed by a particular component may be referred to as a data stream associated with that component. Thus, the color processor 110 may be associated with a first data stream, and the texture processor 112 may be associated with a separate second data stream. Other data streams may be associated with other components of the graphics processor 102 and of the system 100.

The cache management logic 114 is responsive to the observer 118 to vary at least some of its cache retention policies 116 in response to the observed performance of the cache 106.

Cache performance may be calculated individually and separately for each data stream. Performance factors which may be selected or utilized based on the characteristics of each data stream. In the example of FIG. 1, data items produced by the color processor 110 may be either reused by the color processor 110 or subsequently used by the texture processor 112. The texture processor, however, typically only reads data items that have been previously created by the color processor 110, and does not typically create data items for cache storage. Accordingly, cache performance factors or measurements may be chosen and used to manage the different data streams according to these characteristics.

As one example, cache performance with respect to some GPU data streams may be characterized in terms of data item reuse: the number of cached data items that are eventually reused and therefore experience at least one hit after initially being cached. A reuse factor may be calculated to indicate the degree of data item reuse. The reuse factor may indicate, as an example, the fraction of overall cached data items from a particular data stream that have subsequently been reused from the cache. The reuse factor may be calculated separately for each of multiple data streams.

As another example, cache performance may be characterized in terms of GPU data item consumption: the number of cached data items produced by one processing component and eventually consumed or accessed from the cache by another processing component. A consumption factor may be calculated individually for each data stream, indicating the fraction of cached data items of that data stream that are eventually consumed by another processing component.

Cache performance parameters such as reuse factors and consumption factors may be used to vary or tune the retention policies 116 implemented by the cache management logic 114. Depending on the nature of each data stream of the GPU, different parameters may be used in different ways to tune the retention management with respect to each data stream.

In the described embodiment, the observer 118 generates cache performance parameters based on an observed subset 120 of cached data items or cache locations. The observed subset 120 may be distributed statistically over the cache to ensure statistically valid observations with respect to the various graphics data streams cached by the cache 106.

The retention policies 116 may track and prioritize individual data items of the cache 106 in terms of respective "ages." For example, each data item may be assigned an age, ranging from 0 to 3. An age of 0 indicates a data item with relatively low priority or high vulnerability, which may be removed from the cache 106 in order to make room for new data. Increasing ages indicate relatively higher priorities or lower vulnerabilities. Over time, unless there are hits to a data item, its age may be gradually decreased until reaching 0, at which time the data item may be removed or cleared from the cache 106.

In the described implementation, each of the cache retention policies 116 implements the following eviction policy:

General Eviction Policy

Search the cache for the first item having an age of "0", and clear that item. If no such item is found, decrement the ages of all cache items until there exists at least one item having age "0," and clear that item.

In certain embodiments, the observed subset of cache locations 120 may be managed in accordance with a fixed or non-variable observed set retention policy 116(a), regardless of which data stream produced the data items stored in these locations. The fixed or non-variable observed set retention policy 116(a) may use the general eviction policy described above, as well as a non-variable insertion age policy and a non-variable hit promotion policy. These non-variable policies may be similar or identical to those of the Quad-Age algorithm:

Insertion Age Policy for Observed Subset

When a data item is inserted into one of the observed cache locations, assign age=1.

Hit Promotion Policy for Observed Subset

When a data item is subsequently accessed from an observed cache location, promote its age to age=3.

Other, non-observed cache locations may be managed in accordance with variable cache policies. In the described embodiment, insertion age policies and hit promotion policies may be dynamically tuned or varied by the cache management logic 114 based on observations by the observer 118 with respect to the observed subset of cache locations 120.

As an example, the retention policies 116 may include a color stream retention policy 116(b), which is applied to data generated or accessed by the color processor 110. As noted above, the color processor 110 produces data that is either reused by the color processor itself or subsequently used by the texture processor. Retention policies are therefore based on reuse and consumption factors that have been observed and calculated with respect to observer set locations generated and accessed by the color data stream, as well as observer set locations accessed by the texture color stream.

In one embodiment, the fill age policy for the color stream may be implemented as follows:

Insertion Age Policy for Color Stream

If the currently observed consumption factor is high, assign age=3.
If the currently observed reuse factor is low and the currently observed consumption factor is low, assign age=0.
If the currently observed reuse factor is high and the currently observed consumption factor is low, assign age=1.

The hit promotion policy for the color stream may be implemented as follows:

Hit Promotion Policy for Color Stream

If the hit is the result of a read, assign age=3.
If the hit is the result of a write, leave age unchanged.

The above color stream policies are chosen in light of known or anticipated reuse, consumption and other characteristics of the color processor 110 and the texture processor 112.

In certain embodiments, the determination regarding whether the reuse factor or the consumption factor is high or low may be made by comparison to specified thresholds. As an example, the reuse factor may be considered to be "high" when it exceeds a threshold of 8, and may otherwise be considered to be "low". The consumption factor may be considered "high" when it is greater than 1, and otherwise may be considered "low". These thresholds may themselves be variable or tunable upon or during operation of the system 100.

As another example, the retention policies 116 may include a texture stream retention policy 116(c), which is applied to data generated or accessed by the texture processor 112. The texture stream retention policy 116(c) responds to a reuse factor that has been observed and calculated with respect to the observer set locations associated with the texture data stream. In particular, the insertion age policy for the texture stream may be implemented as follows:

Insertion Age Policy for Texture Stream

If the currently observed reuse factor is low, assign age=0.
If the currently observed reuse factor is high, assign age=1.

The hit promotion policy for hits by the texture color stream may be implemented as follows:

Hit Promotion Policy for Texture Stream

If the data item was originally cached as a result of a read by the texture processor, assign age=1.

If the data item was originally cached by the color processor and the currently observed consumption factor is low, assign age=0.

If the data item was originally cached by the color processor and the currently observed consumption factor is high, assign age=1.

Again, the texture stream policies are chosen in light of known or anticipated reuse, consumption, and other characteristics of the color processor 110 and the texture processor 112. Note also that the policies may depend or be based on factors other than observations of the observed subset 120, such as the nature of access and/or the original source of the data item. Note also that the specific ages assigned during insertion or during hits may themselves be tunable upon system boot or dynamically, per stream. The specific ages described above under the headings "Insertion Age Policy for Color Stream," "Hit Promotion Policy for Color Stream," "Insertion Age Policy for Texture Stream," and "Hit Promotion Policy for Texture Stream" are examples of parameters that may be tunable.

The cache retention policies 116 may also include a default retention policy 116(d) that is applied to data streams from other components. In some embodiments, the default policy 116(d) may be the same as the observer set policy 116(a). In other embodiments, the default policy may be customized for existing conditions, and may be variable depending on observed cache performance and conditions.

Figure 2:
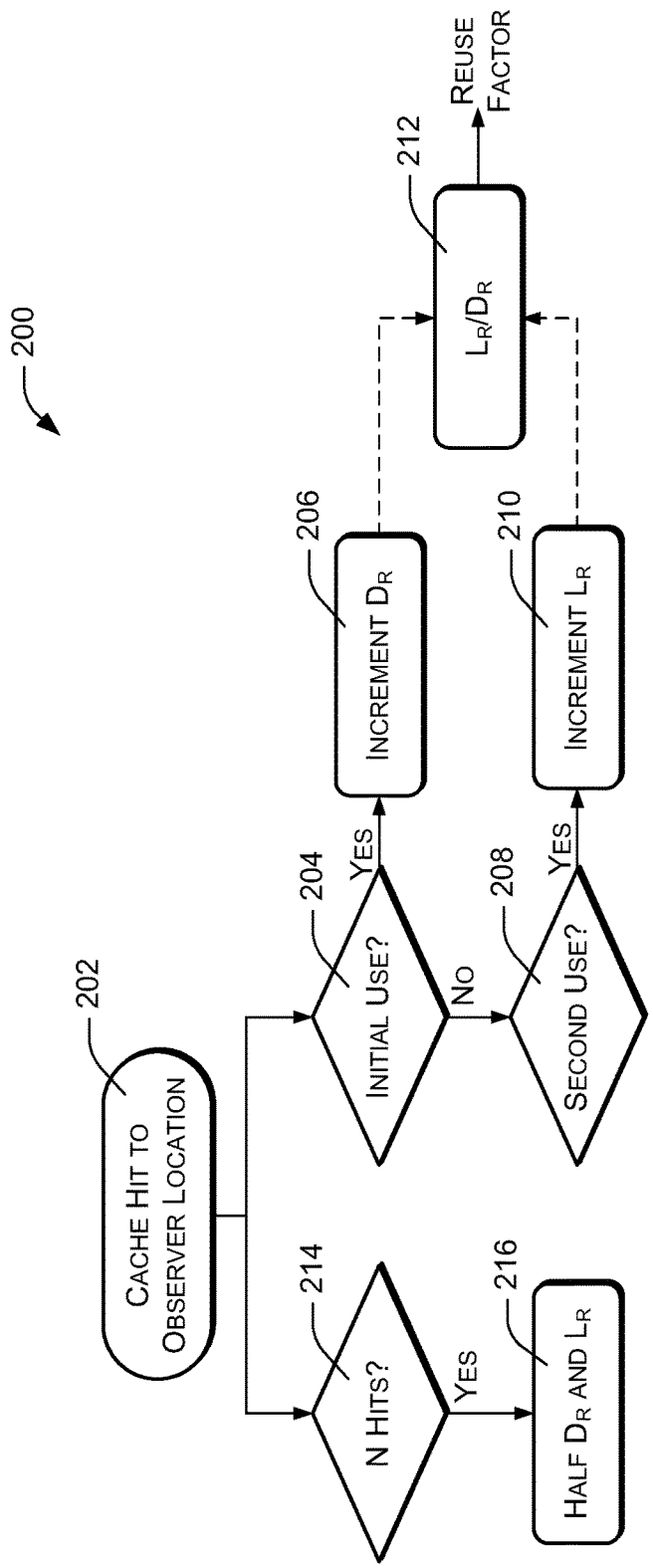
FIGS. 2 and 3 are flow diagrams illustrating examples of determining current cache performance.

FIG. 2 illustrates an example method 200 of determining or calculating a reuse factor based on an observation set of cache locations. The example method 200 may be performed separately for each different type of data stream, such as data streams produced by different types of processors or processing components.

The actions of FIG. 2 are performed in response to an event 202, comprising a cache hit from a particular data stream to a location of the cache observed set. An action 204 comprises determining whether the hit represents or is the result of an initial use or insertion by the data stream. If so, as indicated by the "yes" branch from the action 204, an action 206 is performed of incrementing a use counter referred to as $D_R$. Otherwise, as indicated by the "no" branch from the action 204, an action 208 is performed of determining whether the hit represents or is the result of a second use of the cache location by the data stream. If so, as indicated by the "yes" branch from the action 208, an action 210 is performed of incrementing a reuse counter referred to as $L_R$.

An action 212 may comprise dividing the reuse factor $L_R$ by the use factor $D_R$ to produce a reuse factor corresponding to the data stream. Different reuse factors may be calculated in the same manner for respective data streams.

Also in response to the cache hit event 202, an action 214 is performed, comprising determining whether N observer set hits have occurred. If so, as indicated by the "yes" branch of from the action 214, an action 216 is performed of halving the $D_R$ and $L_R$ counters. An N-counter may be maintained for this purpose, and may be incremented upon every cache hit to an observer location.

Figure 3:
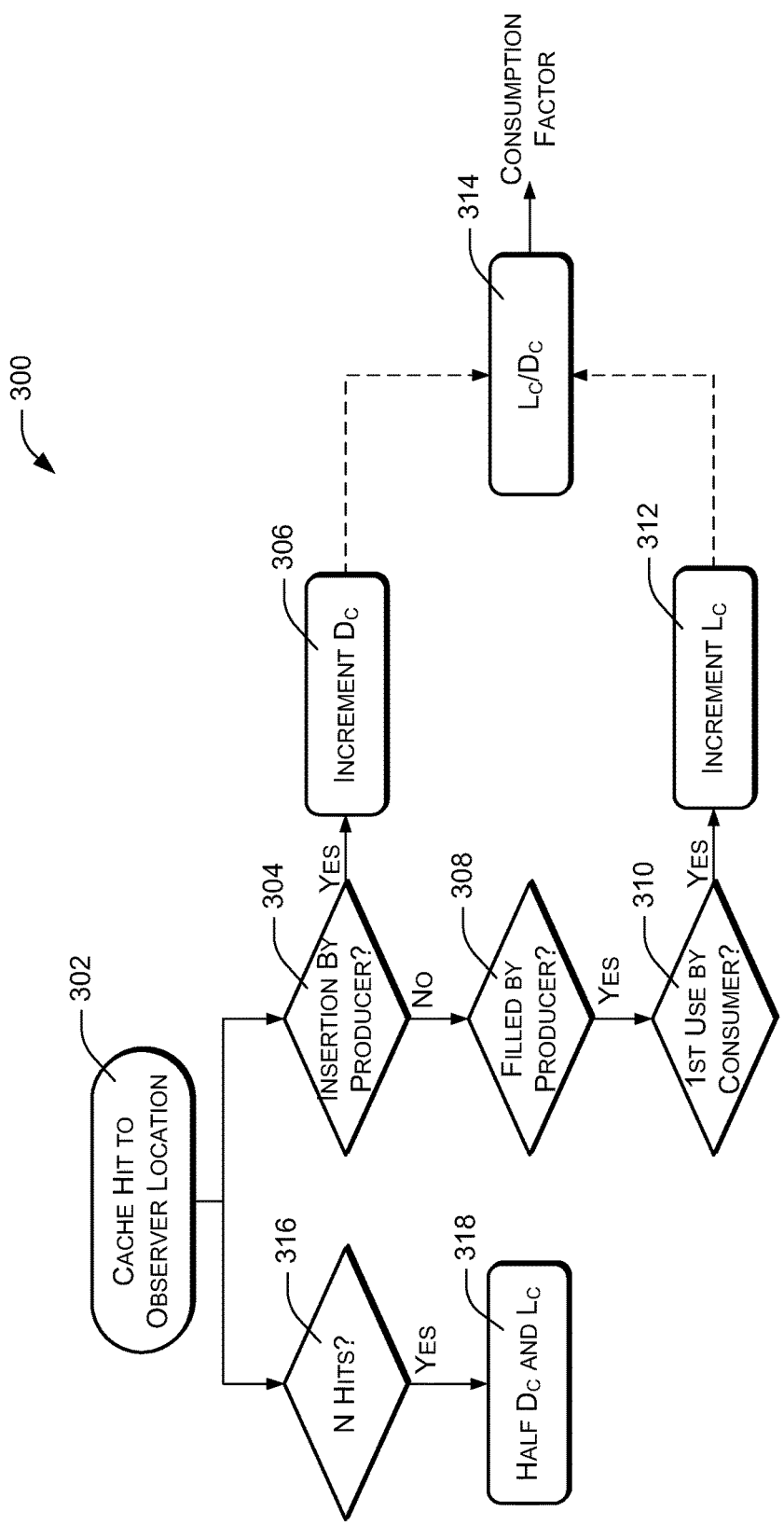

FIG. 3 illustrates an example method 300 of determining or calculating a consumption factor based on an observed set of cache locations. The example method 300 may be performed separately for each pair of producer/consumer components. The color processor 110 and the texture processor 112 of FIG. 1 are examples of producer and consumer processors, respectively.

The actions of FIG. 3 are performed in response to an event 302, comprising a cache hit from the data streams of either the producer data stream or the consumer data stream to a location of the cache observed subset. An action 304 comprises determining whether the hit represents or is the result of an initial use on insertion by the producer data stream. If so, as indicated by the "yes" branch from the action 304, an action 306 is performed of incrementing a production counter referred to as $D_C$. Otherwise, as indicated by the "no" branch from the action 304, an action 308 is performed of determining whether the data item that is the object of the hit was previously inserted by the producer data stream. If so, as indicated by the "yes" branch from the action 308, an action 310 is performed of determining whether the hit is the first use or hit, by the consumer processor. If so, as indicated by the "yes" branch from the action 310, an action 312 is performed of incrementing a consumption counter referred to as $L_C$. An action 314 may comprise dividing the production counter $L_C$ by the consumption counter $D_C$ to produce the consumption factor corresponding to pair of processing components or data streams.

Also in response to the cache hit event 302, an action 316 may be performed, comprising determining whether N hits have occurred with respect to the observed cache locations. If so, as indicated by the "yes" branch from the action 316, an action 318 may be performed, comprising halving the $D_C$ and $L_C$ counters. An N-counter may be maintained for this purpose, and may be incremented upon every cache hit to an observer location.

Figure 4:
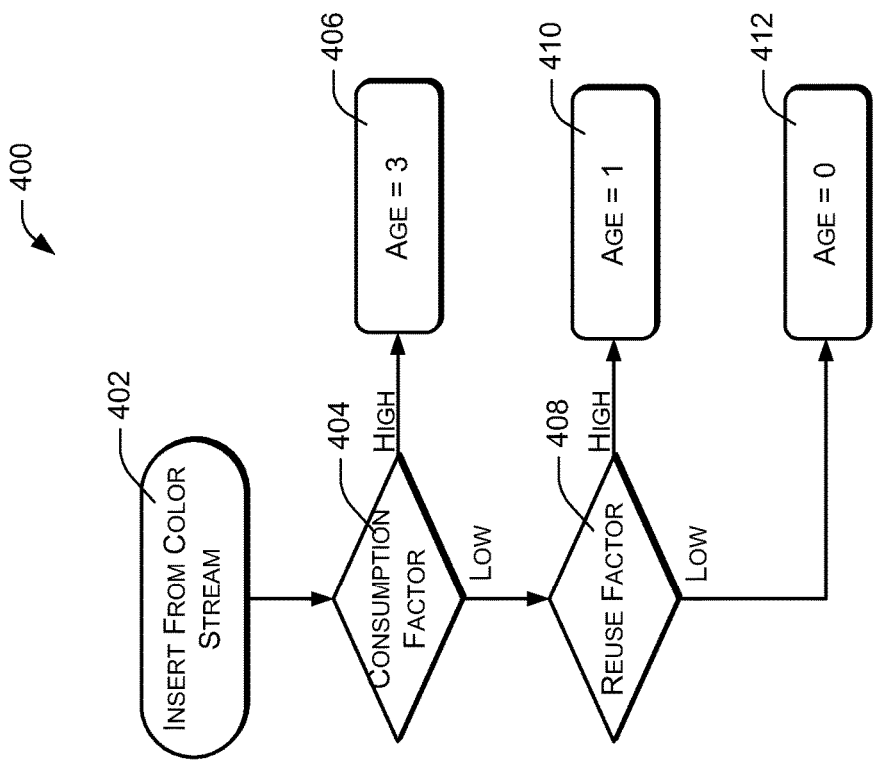

FIG. 4 illustrates an example method 400 of implementing an insertion age policy for the data stream of the color processor 110. The method is performed in response to an event 402, which comprises a new data item being inserted by the color processor 110. An action 404 comprises determining whether the currently observed consumption factor, calculated as described above with reference to FIG. 3, is relatively high or relatively low. If the consumption factor is relatively high, as indicated by the "high" branch from the action 404, an action 406 is performed of setting the age of the new data item to 3. If the consumption factor is relatively low, as indicated by the "low" branch from the action 404, an action 408 is performed of determining whether the currently observed reuse factor corresponding to the data stream of the color processor 110 is relatively high or relatively low. If the reuse factor is relatively high, an action 410 is performed of setting the age of the new data item to "1". If the reuse factor is relatively low, as indicated by the "low" branch from the action 408, an action 412 is performed of setting the age of the new data item to "0".

Figure 5:
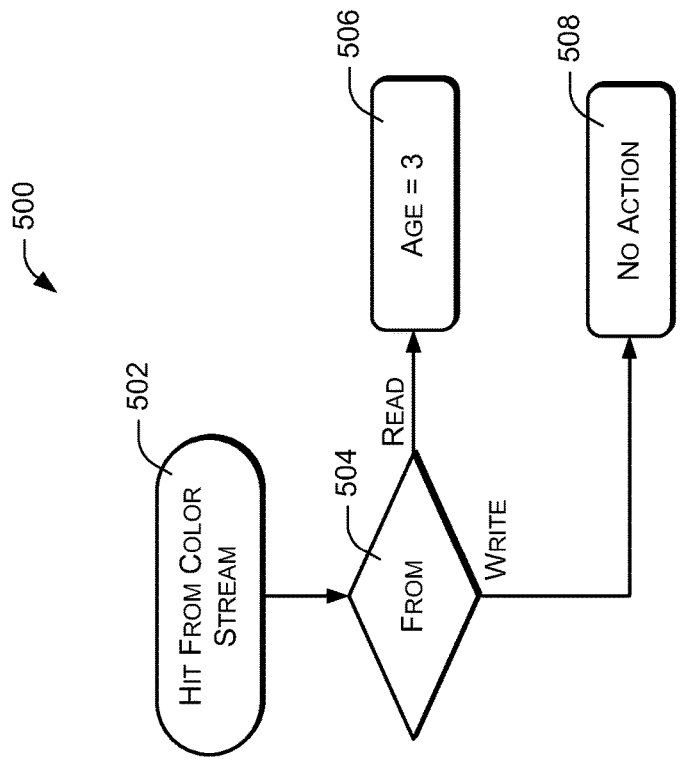
FIGS. 4 and 5 are flow diagrams illustrating an example of a cache retention policy that may be used with a color stream of a graphics pipeline.

FIG. 5 illustrates an example method 500 of implementing a hit promotion policy for the data stream generated by the color processor 110. The method 500 is performed in response to an event 502, which comprises a hit from the data stream of the color processor 110. An action 504 comprises determining whether the hit is the result of a read from the cache or a write to the cache. If the hit is the result of a read, as indicated by the "read" branch from the action 504, an action 506 is performed of setting the age of the data item to "3". If the hit is the result of a write, as indicated by the "write" branch from the action 504, an action 508 is performed of leaving the age of the data item unchanged.

Figure 6:
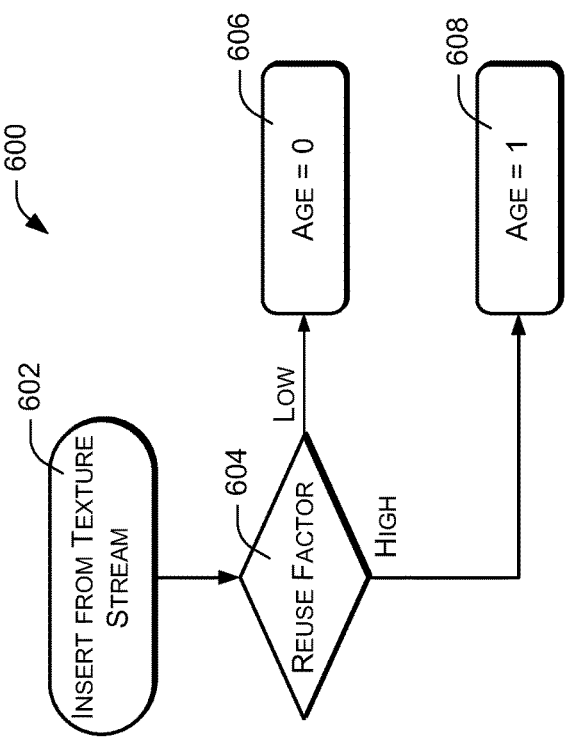

FIG. 6 illustrates an example method 600 of implementing an insertion age policy for the data stream of the texture processor 112. The method is performed in response to an event 602, which comprises an insertion from the data stream of the texture processor 112. An action 604 may comprise determining whether the currently observed reuse factor for the data stream of the texture processor is relatively low or relatively high. If the reuse factor is relatively low, as indicated by the "low" branch of the action 604, an action 606 is performed of setting the age of the data item to "0". If the reuse factor is relatively high, as indicated by the "high" branch of the action 604, an action 608 is performed of setting the age of the data item to "1".

Figure 7:
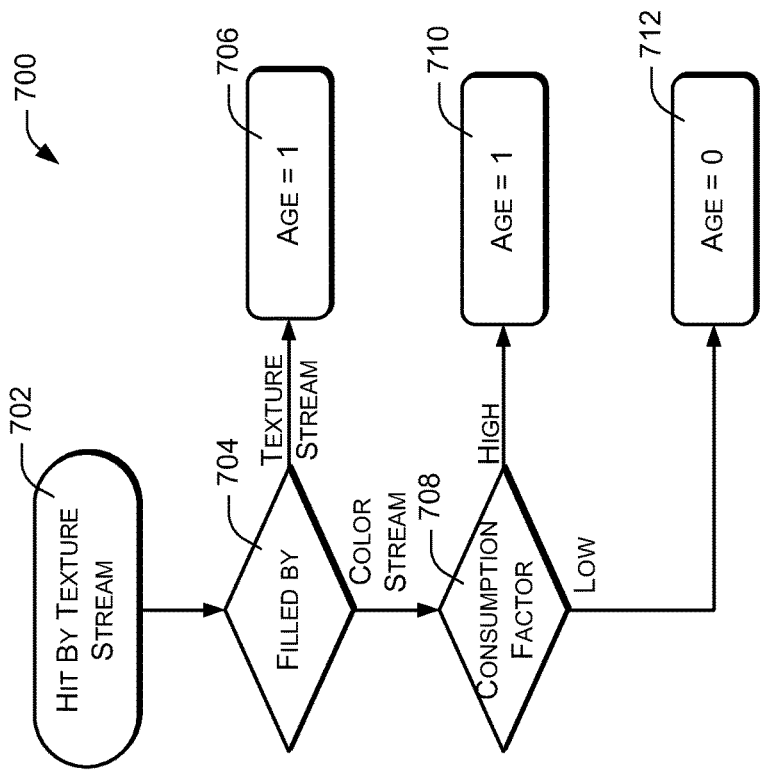
FIGS. 6 and 7 are flow diagrams illustrating an example of a cache retention policy that may be used with a texture stream of a graphics pipeline.

FIG. 7 illustrates an example method 700 of implementing a hit promotion policy for the data stream of the texture processor 112. The method is performed in response to an event 702, which comprises a hit from the data stream of the texture processor 112. An action 704 comprises determining whether the data item that is the object of the hit was originally inserted by the texture stream or the color stream. If the data item was originally inserted by the texture stream, as indicated by the "texture stream" branch from the action 704, an action 706 is performed of setting the age of the data item to "1". If the data item was originally inserted by the color stream, as indicated by the "color stream" branch from the action 704, an action 708 is performed of determining whether the currently observed consumption factor is relatively high or low. If the currently observed consumption factor is high, as indicated by the "high" branch from the action 708, an action 710 is performed of setting the age of the data item to "1". If the currently observed consumption factor is low, as indicated by the "low" branch from the action 708, an action 712 is performed of setting the age of the data item to "0".

Figure 8:
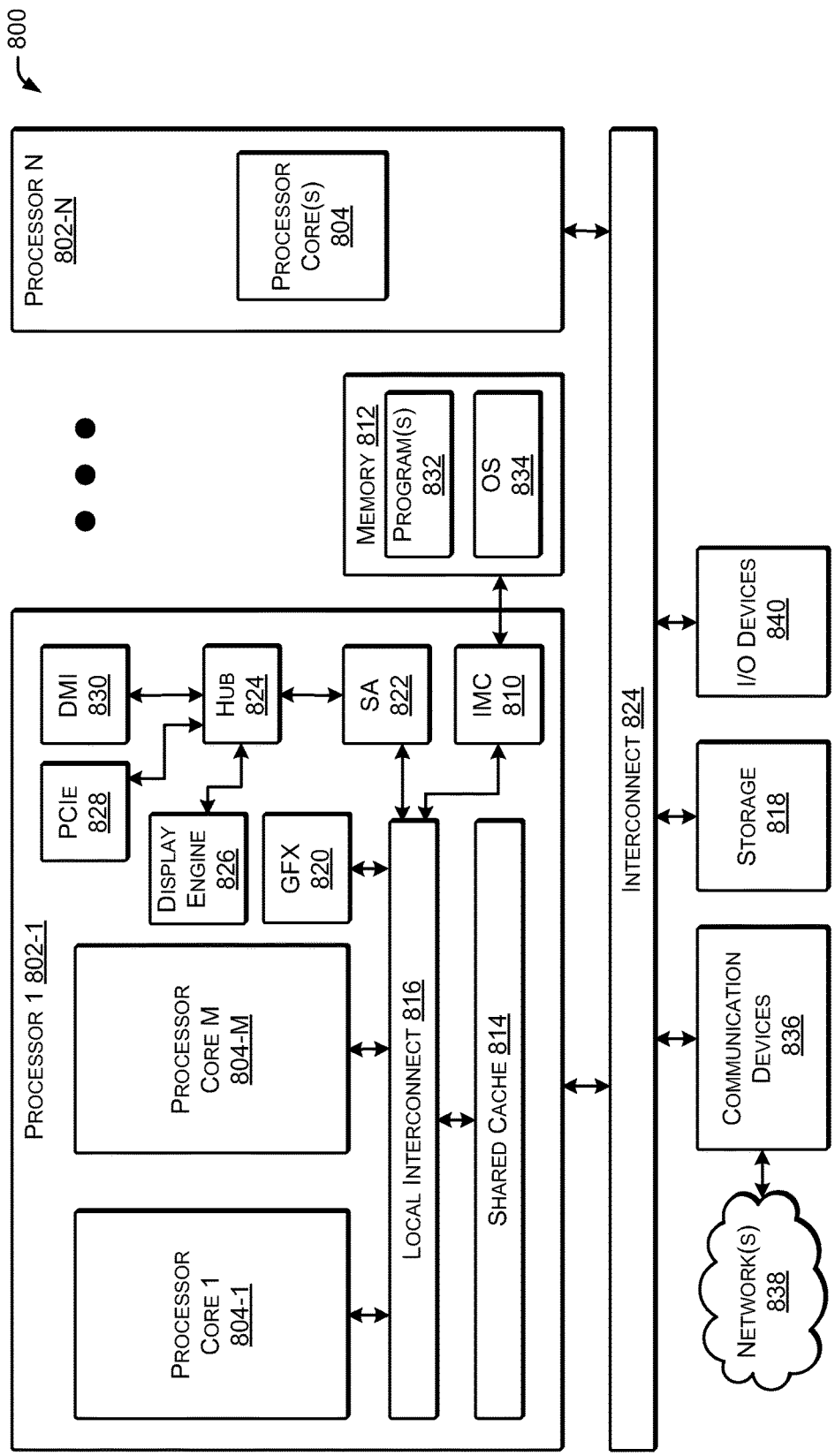
FIG. 8 is a block diagram of an illustrative architecture of a system in which the described cache management techniques may be implemented.

FIG. 8 is a block diagram of an illustrative architecture of a system 800 in which the techniques described above may be implemented. The system 800 may include one or more processors 802-1, . . . , 802-N (where N is a positive integer≥1), each of which may include one or more processor cores 804-1, . . . , 804-M (where M is a positive integer≥1). In some implementations the processor(s) 802 may be a single core processor, while in other implementations, the processor(s) 802 may have a large number of processor cores, each of which may include some or all of the components illustrated in FIG. 8.

The processor(s) 802 and processor core(s) 804 can be operated, via an integrated memory controller (IMC) 810 in connection with a local interconnect 816, to read and write to a memory 812. The processor(s) 802 and processor core(s) 804 can also execute computer-readable instructions stored in the memory 812 or other computer-readable media. The memory 812 may include volatile and nonvolatile memory and/or removable and non-removable media implemented in any type of technology for storage of information, such as computer-readable instructions, data structures, program modules or other data. Such memory may include, but is not limited to, RAM, ROM, EEPROM, flash memory or other memory technology. In the case in which there are multiple processor cores 804, in some implementations, the multiple processor cores 804 may share a shared cache 814, which may be accessible via the local interconnect 816. The shared cache 814 may be utilized by various processors, including graphics processors, of the processor 802, and may be managed in accordance with the techniques described above.

Storage 818 may be provided for storing data, code, programs, logs, and the like. The storage 818 may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 800, the memory 812 and/or the storage 818 may be a type of computer readable storage media and may be a non-transitory media.

In various embodiments, the local interconnect 816 may also communicate with a graphical controller or graphics processing unit 820 to provide graphics processing. As described above, the graphics processing unit 820 may implement one or more graphics processing pipelines, and may utilize the shared cache 814.

In some embodiments, the local interconnect 816 may communicate with a system agent 822. The system agent 822 may be in communication with a hub 824, which connects a display engine 826, a PCIe 828, and a DMI 830.

The memory 812 may store functional components that are executable by the processor(s) 802. In some implementations, these functional components comprise instructions or programs 832 that are executable by the processor(s) 802. The example functional components illustrated in FIG. 8 further include an operating system (OS) 834 to manage operation of the system 800.

The system 800 may include one or more communication devices 836 that may include one or more interfaces and hardware components for enabling communication with various other devices over a communication link, such as one or more networks 838. For example, communication devices 836 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating via such networks are well known and will not be discussed herein in detail.

The system 800 may further be equipped with various input/output (I/O) devices 840. Such I/O devices 840 may include a display, various user interface controls (e.g., buttons, joystick, keyboard, touch screen, etc.), audio speakers, connection ports and so forth. An interconnect 824, which may include a system bus, point-to-point interfaces, a chipset, or other suitable connections and components, may be provided to enable communication between the processors 802, the memory 812, the storage 818, the communication devices 836, and the I/O devices 840.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A processor, comprising:
  a cache;
  first logic to monitor a subset of locations of the cache to determine performance of the cache, the determined performance indicating a reuse factor and a consumption factor, the first logic further to assign an age to each inserted cached data item based on the reuse factor and the consumption factor; and
  second logic to apply a retention policy to the cache, when it is necessary to make room for a new data item, to evict a cached data item selected from cached data items having the lowest age, and to vary the retention policy in response to the determined cache performance;

wherein the reuse factor comprises a ratio of a number of subsequent accesses to a cached data item divided by a number of initial accesses to the cached data item.

2. The processor of claim 1, further comprising:
a plurality of processing components that are to share the cache, wherein the plurality of processing components are to be associated with respective data streams;
wherein the first logic is further to determine individual performances corresponding to the respective data streams; and
wherein the second logic is further to apply different retention policies to the respective data streams, based at least in part on the individual performances corresponding to the respective data streams.

3. The processor of claim 1, further comprising a plurality of components that are to share the cache.

4. The processor of claim 1, wherein the cache is to cache a plurality of data streams associated with a graphics processing pipeline.

5. The processor of claim 1, wherein:
the cache is to cache a plurality of data streams; and
the second logic is further to apply different retention policies to different data streams.

6. The processor of claim 1, wherein:
the cache is to cache a plurality of data streams; and
the second logic is further to apply different retention policies to different data streams and to vary of the retention policies in response to the determined cache performance.

7. The processor of claim 1, wherein the consumption factor comprises a ratio of a number of first uses of cached data items by a consumer divided by a number of cached data items inserted by a producer.

8. The processor of claim 1, wherein the determined performance indicates observed characteristics of a plurality of data streams.

9. A system, comprising:
a cache having locations to store data in accordance with one or more retention policies;
first logic to monitor a subset of locations of the cache to determine performance of at least the subset of the cache locations, the determined performance indicating a reuse factor and a consumption factor, the first logic further to assign to each inserted cached data item an age based on the reuse factor and the consumption factor; and
second logic to apply a retention policy to the cache, when it is necessary to make room for a new data item, to evict a cached data item selected from cached data items having the lowest age, and to vary the one or more retention policies in response to the determined performance;
wherein the consumption factor comprises a ratio of a number of first uses of cached data items by a consumer divided by a number of cached data items inserted by a producer.

10. The system of claim 9, further comprising:
a plurality of processor cores; and
a graphics processing unit;
wherein the processor cores and the graphics processing unit are to share the cache.

11. The system of claim 9, further comprising a graphics processing pipeline having processing components that are to share the cache.

12. The system of claim 9, further comprising:
a plurality of processing components that are to share the cache, wherein the plurality of processing components are to be associated with respective data streams; and
wherein the first logic is further to determine cache performances corresponding to the respective data streams.

13. The system of claim 9, wherein:
the cache is to cache a plurality of data streams; and
the one or more retention policies correspond respectively to the data streams.

14. The system of claim 9, wherein:
the cache is to cache a plurality of data streams; and
the second logic is to vary at least two of the retention policies in response to the determined performance.

15. The system of claim 9, wherein the reuse factor comprises a ratio of a number of subsequent accesses to a cached data item divided by a number of initial accesses to the cached data item.

16. A method, comprising:
retaining elements of a cache in accordance with a cache retention policy;
observing performance of the cache by monitoring a subset of locations of the cache to;
determining performance of at least the subset of locations to generate a reuse factor and a consumption factor, and to assign to each inserted cached data item an age based on the reuse factor and the consumption factor;
applying a retention policy to the cache, when it is necessary to make room for a new data item, to evict a cached data item selected from cached data items having the lowest age; and
varying the cache retention policy in accordance with the observed performance of the cache
wherein the consumption factor comprises a ratio of a number of first uses of cached data items by a consumer divided by a number of cached data items inserted by a producer.

17. The method of claim 16, wherein the subset of locations is fewer than all of the cache locations and distributed over the cache to enhance statistical validity of observations with respect to various data streams stored in the cache.

18. The method of claim 16, wherein the observing is performed separately with respect to different data streams.

19. The method of claim 16, further comprising applying different cache retention policies to different data streams.

20. The method of claim 16, wherein the reuse factor comprises a ratio of a number of subsequent accesses to a cached data item divided by a number of initial accesses to the cached data item.

* * * * *